(12) United States Patent
Kakiuchi et al.

(10) Patent No.: US 6,612,039 B2
(45) Date of Patent: Sep. 2, 2003

(54) BLADE MOUNTING DEVICES

(75) Inventors: Yasuhiro Kakiuchi, Anjo (JP); Shinsuke Mori, Anjo (JP)

(73) Assignee: Makita Corporation, Anjo (JP)

( * ) Notice: Subject to any disclaimer, the term of this patent is extended or adjusted under 35 U.S.C. 154(b) by 0 days.

(21) Appl. No.: 09/855,019

(22) Filed: May 15, 2001

(65) Prior Publication Data

US 2002/0017026 A1 Feb. 14, 2002

(30) Foreign Application Priority Data

May 16, 2000 (JP) .......................................... 2000-143922
Mar. 27, 2001 (JP) .......................................... 2001-090448

(51) Int. Cl.$^7$ ............................................. B23D 51/10
(52) U.S. Cl. ................................. 30/392; 30/337; 279/75
(58) Field of Search ........................... 30/392, 393, 337, 30/339; 279/71, 75, 81, 905

(56) References Cited

U.S. PATENT DOCUMENTS

| | | | |
|---|---|---|---|
| 3,583,716 A | 6/1971 | Daniel, Jr. .................... | 279/81 |
| 3,750,283 A | 8/1973 | Hoffman ...................... | 30/338 |
| 3,823,473 A | 7/1974 | Hoffman ...................... | 30/338 |
| 3,927,893 A | 12/1975 | Dillon et al. .................. | 279/75 |
| 4,299,402 A | 11/1981 | Hoffman ...................... | 30/337 |
| 5,103,565 A | 4/1992 | Holzer, Jr. .................... | 30/392 |
| 5,306,025 A | 4/1994 | Langhoff ...................... | 30/392 |
| 5,487,221 A | 1/1996 | Oda et al. ..................... | 30/392 |
| 5,573,255 A | * 11/1996 | Salpaka ........................ | 279/75 |
| 5,575,071 A | 11/1996 | Phillips et al. ................. | 30/392 |
| 5,647,133 A | 7/1997 | Dassoulas .................... | 30/392 |

(List continued on next page.)

FOREIGN PATENT DOCUMENTS

| | | |
|---|---|---|
| DE | 4102011 | 12/1991 |
| GB | 2336806 | 11/1999 |
| GB | 2338205 | 12/1999 |
| WO | 97/31745 | 9/1997 |

*Primary Examiner*—Hwei-Siu Payer
(74) *Attorney, Agent, or Firm*—Dennison, Schultz & Dougherty

(57) ABSTRACT

A tool-less blade clamps (10, 50) may include a rod (2, 52) having a slot (2a, 2c, 52c) and a guide slot (2b, 52b) formed substantially perpendicularly to the slot (2a, 2c, 52c). A control member (20, 56) may be slidably disposed within the slot (2a, 2c, 52c) and a spring (21, 57) preferably biases the control member (20, 56) towards a forward portion of the slot (2a, 2c, 52c). The rod (2, 52) rotatably supports a sleeve (11, 53). Preferably, the sleeve (11, 53) being prevented from axially displacing with respect to the rod (2, 52) when the sleeve (11, 53) rotates about the rod (2, 52). An L-shaped slot (16, 53a) may be formed in the sleeve (11, 53) and may have a blade lock slot (16b, 53ab) disposed substantially perpendicularly to a blade lock control slot (16a, 53aa). The control member (20, 53) may include a pin (22, 55) that extends through the guide slot (2b, 52b) and travels within the L-shaped slot (16, 53a). The rod (2, 52) may include a hole (2e, 59a) formed substantially perpendicular to the slot (2a, 2c, 52c). A pressing member (18, 51) may be slidably disposed within the hole (2e, 59a). A cam surface (17, 53b) is preferably defined along an inner surface of the sleeve (11, 53) and the cam surface (17, 53b) urges the pressing member (18, 51) towards the slot (2a, 2c, 52c) when the sleeve (11, 53) is rotated about the rod (2, 52) to a blade clamp position. Preferably, rotation of the sleeve (11, 53) towards a blade release position causes the control member (20, 53) to move towards the forward portion of the slot (2a, 2c, 52c) due to the biasing force of the spring (21, 57) and the sleeve (11, 53) is automatically locked in the blade release position. Further, insertion of a blade (3) into the slot (2a, 2c, 52c) releases the sleeve (11, 53) from the blade release position and the sleeve (11, 53) automatically returns to the blade clamping position to securely attach the blade (3) to the rod (2, 52).

80 Claims, 10 Drawing Sheets

U.S. PATENT DOCUMENTS

| | | | |
|---|---|---|---|
| 5,661,909 A | 9/1997 | Kondo et al. | 30/392 |
| 5,765,463 A | 6/1998 | Okubo et al. | 83/747 |
| 5,794,352 A | 8/1998 | Dassoulas | 30/392 |
| 5,903,983 A | 5/1999 | Jungmann et al. | 30/392 |
| 5,946,810 A | 9/1999 | Hoelderlin et al. | 30/392 |
| 5,988,034 A | 11/1999 | Okubo et al. | 83/699.21 |
| 6,009,627 A | 1/2000 | Dassoulas | 30/392 |
| 6,023,848 A | 2/2000 | Dassoulas | 30/392 |
| 6,209,208 B1 | 4/2001 | Marinkovich et al. | 30/392 |
| 6,260,281 B1 | 7/2001 | Okumura et al. | 30/392 |
| 6,295,736 B1 | 10/2001 | Dassoulas | 30/192 |

* cited by examiner

BLADE MOUNTING DEVICES

BACKGROUND OF THE INVENTION

1. Technical Field

The present invention relates to blade mounting devices that permit a blade to be easily and reliably attached to a machine tool, such as a reciprocating saw or a jigsaw. Such blade mounting devices are also known as keyless or tool-less blade clamps or clamping systems for attaching a saw blade to a reciprocating saw.

2. Description of the Related Art

A known tool-less blade clamp for reciprocating saws is disclosed in the U.S. Pat. No. 5,575,071, which is reproduced herein as FIG. 13. The known blade mounting device 30 includes an axially reciprocating rod 31 driven by a motor, a blade lock operation sleeve (clamp collar) 32 rotatably attached to the end of the rod 31 and a torsion spring 34 that biases the blade lock operation sleeve 32 toward a blade clamping position. The blade 35 is inserted into a slot 31a having a uniform width and cross-section. A bearing support hole (aperture) 31b also is formed at the end of the rod 31 and a ball or bearing 33 is disposed within the bearing support hole 31b. The inner surface of the blade lock operation sleeve 32 has a cam face with a gradually varying internal diameter. The bearing 33 is supported between the cam face and the bearing support hole 31b. A guide or stop pin 36 is disposed within a slot 32a that is radially disposed within the blade lock operation sleeve 32. The blade lock operation sleeve 32 rotates about the rod 31 within the range in which the guide pin 36 can move within the slot 32a.

In order to mount a blade, the blade lock operation sleeve 32 is manually rotated toward a blade release position against the biasing force of the spring 34. As a result of the manual rotation, the bearing 33 moves to the large-diameter side of the cam face and thus moves away from the slot 31a. Therefore, the base of the blade 35 may be inserted into the slot 31a. When the base of the blade 35 is inserted into the slit 31a and the blade lock operation sleeve 32 is not restrained by the operator from returning to the blade clamping position, the blade lock operation sleeve 32 rotates toward the blade clamping position due to the biasing force of the spring 34. As the sleeve 32 reaches the blade clamping position, the bearing 33 is pressed toward the small-diameter side of the cam face. Therefore, the bearing 33 is pushed into the support hole 31b and protrudes from the slot 31a. The bearing 33 thereby lodges within a blade lock hole 35a of the blade 35 and the blade 35 is secured to the rod 31.

According to the known blade mounting device 30, the sleeve 32 must be manually held in the blade release position when the blade 35 is being inserted or withdrawn from the sleeve 32. Thus, the blade insertion and withdrawal operations require the operator to manually hold the sleeve 32 in the blade release position with one hand and insert or withdraw the blade 35 with the other hand. This requirement present a danger that the operator will be injured by the saw blade, because it can be difficult to change saw blades while firmly holding the sleeve 32 at the same time. The blade mounting devices of Japanese Patent No. 2000-117534 and WO 97/31745 also appear to share this problem.

U.S. Pat. No. 5,946,810 teaches a blade mounting device (chucking tube) that can be locked in the blade release position in order to overcome this problem. However, the chucking tube of the '810 patent must be axially displaced relative to the reciprocating rod along a threaded portion in order to tighten the blade within the blade mounting device. That is, the blade mounting device of the '810 patent can not utilize a ball or bearing to firmly secure the saw blade to the rod along a longitudinal face of the saw blade and the saw blade receiving slot. Instead, the blade mounting device of the '810 patent only supports or fixes the blade at the outermost tip of the blade and along a peripheral edge of a pair of lugs that extend perpendicularly from the longitudinal face of the saw blade. Because the saw blade is not supported along the longitudinal face of the saw blade, the saw blade can wobble or shake during a cutting operation. Further, the blade mounting device of the '810 patent can not be utilized with standardized saw blade designs and can only be utilized with a saw blade having the pair of lugs formed on the shank portion of the blade. Moreover, even though insertion of the saw blade will release the chucking tube from the blade release position, the operator must still manually rotate the chucking tube in order to clamp or fix the blade within the chucking tube. In fact, the operator must manually rotate the chucking tube while pressing the saw blade inwardly against the biasing force of a compression spring in order to ensure that the saw blade is securely fixed.

Consequently, there is a long-felt need for a blade mounting device that can conveniently and reliably attach a saw blade to a reciprocating rod.

SUMMARY OF THE INVENTION

It is, accordingly, one object of the present teachings to provide improved blade mounting devices. For example, improved blade mounting devices may have a relatively simple structure and preferably permit the blade to be easily mounted on or withdrawn from the machine tool, such as a reciprocating saw. The improved blade mounting device also may firmly support a longitudinal face of the saw blade in order to prevent the saw blade from wobbling or shaking during a cutting operation. Moreover, improved blade mounting devices preferably can be utilized with saw blades having standard universal designs.

In one representative embodiment of the present teachings, a blade mounting device may include a blade lock operating member, a blade lock control member and a blade lock. The blade lock operating member preferably moves between a blade clamping position and a blade release position. The blade lock operating member may be normally biased towards the blade clamping position. The blade lock control member preferably moves between a blade lock preventing position and a blade lock permitting position. The blade lock control member prevents the blade lock operating member from moving to the blade clamping position when the blade lock control member is located at the blade lock preventing position. Further, the blade lock control member permits the blade lock operating member to move to the blade clamping position when the blade lock control member is located at the blade lock permitting position. The blade lock control member is pushed and moved from the blade lock preventing position to the blade lock permitting position by the blade when the blade is inserted to the rod. The blade lock securely clamps or attaches the blade to the rod when the blade lock operating member moves to the blade clamping position.

In another aspect of the present teachings, the blade lock operating member can move to the blade clamping position when the blade lock control member is in the blade lock permitting position. Further, the blade moves the blade lock control member when the blade is inserted into the rod. Because the blade lock control member moves to the blade lock permitting position due to the insertion of the blade into the rod of the machine tool, the blade clamping operation can be easily performed without requiring a special operation of the blade lock operating member.

In another aspect of the present teachings, blade mounting devices may include an L-shaped slot. A pin may be received within the L-shaped slot. The pin may travel along one portion of the L-shaped slot to change the blade mounting device from a blade clamping position to a blade release position. The pin may then move along the other portion of the L-shaped slot in order to lock the blade mounting device in the blade release position. Therefore, the blade mounting device can be locked in the blade release position in order to permit the operator to change saw blades without being required to manually hold the blade mounting device in the blade release position.

In another aspect of the present teachings, blade mounting devices may include a camming surface that pushes a pressing member, such as a pin or a ball, against the longitudinal face of the saw blade, when the blade mounting device is in the blade clamping position. By pressing and firmly supporting the longitudinal face of the saw blade during the cutting operation, wobbling or shaking of the saw blade during operation will be minimized.

In another aspect of the present teachings, blade mounting devices are taught that do not move along the longitudinal axis of the reciprocating rod when the blade mounting device is rotated from the blade clamping position to the blade release position.

In another aspect of the present teachings, blade mounting devices are taught that have a saw blade receiving slot. A control member, which for example may be a substantially wedge shaped object or a substantially cylindrical object, may be slidably supported within the saw blade receiving slot between a forward position and a rear position with respect to the rod. A biasing member, such as a compression spring, preferably biases the control member towards the forward position. The control member is preferably designed to abut the saw blade when the saw blade is inserted into the saw blade receiving slot. Further, the control member may be further designed to automatically shift the blade mounting device from the blade release position to the blade clamping position when the saw blade is pushed deeper into the saw blade receiving slot against the biasing force of the biasing member. Thus, the operator is not required to manually return the blade mounting device to the blade clamping position after inserting the saw blade.

In another aspect of the present teachings, blade mounting devices are taught that have means for clamping the blade within the blade mounting device by pressing a longitudinal face of the saw blade and means for locking the blade mounting device in the blade release position. The means for clamping the blade in the blade clamping position may be a pressing member, such as a ball or pin, or may be any other structure that fixedly supports the longitudinal face of the saw blade. The means for locking the blade mounting device in the blade release position may be, for example, a pin and slot structure, although a variety of structures may be utilized to perform this function. Thus, in this embodiment of the present teachings, blade mounting devices are taught that can conveniently and reliably secure a saw blade to a machine tool.

Other objects, features and advantages of the present invention will be readily understood after reading the following detailed description together with the accompanying drawings and the claims.

DETAILED DESCRIPTION OF THE INVENTION

Figure 1:
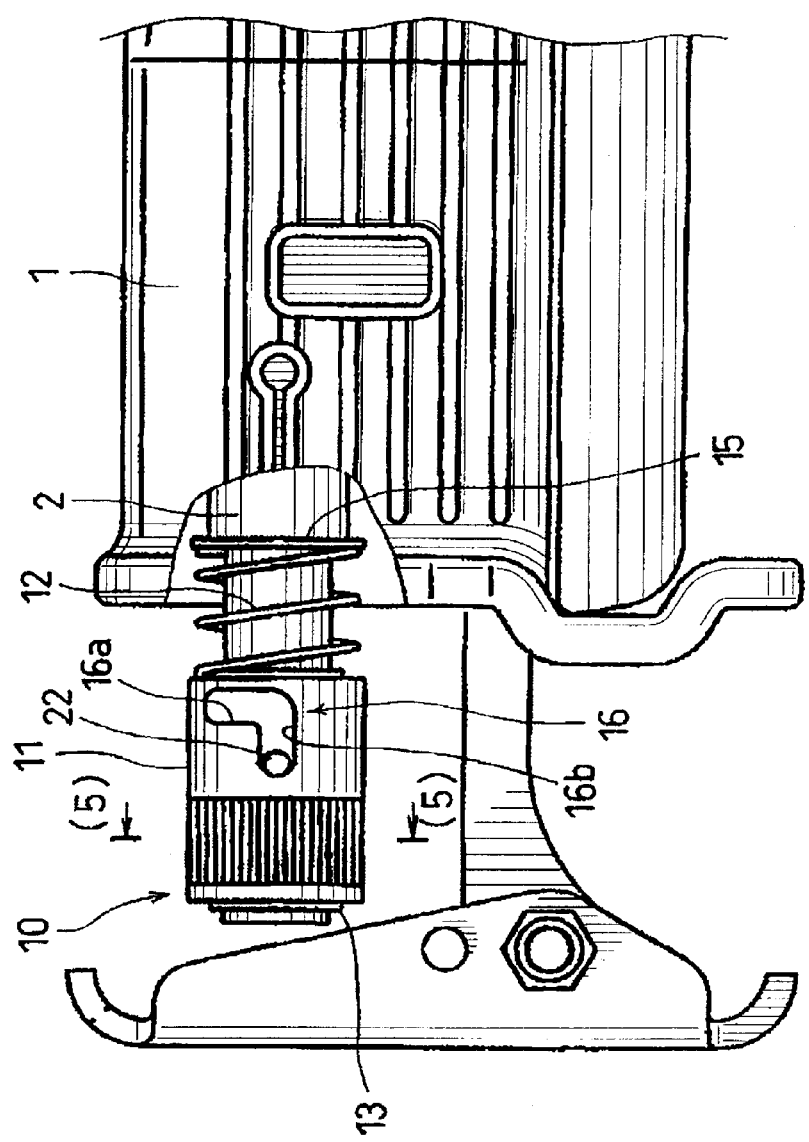
FIG. 1 shows the first representative blade mounting device that is attached to a reciprocating saw.

Representative blade mounting device according to the present teachings are preferably adapted to mount a blade in blade receiving slot formed in a rod of a machine tool. Such blade mounting devices may include, for example, a blade lock operating member that moves between a blade clamping position and a blade release position. The blade lock operating member may be normally biased towards the blade clamping position. A blade lock control member preferably moves between a first position and a second position. When the blade lock control member is located in the first position, the blade lock control member prevents the blade lock operating member from moving to the blade clamping position. When the blade lock control member is located in the second position, the blade lock control member permits the blade lock operating member to move to the blade clamping position. Preferably, the blade lock control member automatically moves from the first position to the second position when the blade is inserted into the blade receiving slot.

Means also may be provided for clamping the blade within the blade receiving slot when the blade lock operating member is in the blade clamping position. Preferably, the clamping means presses a longitudinally extending face of the blade against a longitudinally extending face of the saw blade receiving slot. The clamping means may include a pressing member, such as a ball or a pin.

The rod may rotatably support the blade lock operating member. Thus, the blade lock operating member may rotate about the rod between the blade clamping position and the blade release position. A biasing means, such as a compression spring, may bias the blade lock operating member towards the blade clamping position. In another aspect of the present teachings, the blade lock operating member may include a blade lock operating sleeve that is rotatably supported around a front end of the rod. Thus, the blade lock operating sleeve may rotate from the blade clamping position to the blade release position about the outer circumferential surface of the rod.

In other aspect of the present teachings, the clamping means may include a blade lock pin that engages a blade lock hole disposed within a base portion of the blade when the blade mounting device is in the blade clamping position. A cam surface may be defined within the inner surface of the blade lock operating member. Thus, the blade lock pin is urged toward the engaged position when the cam surface rotates about the rod.

The blade lock control member may be biased towards the second position by a torsion spring. The blade lock pin may have a tapered surface that assists the release of the blade lock pin from the blade lock hole when the blade control member is rotated to the first position. The blade lock pin may be biased so as to be released from the blade lock hole when the blade lock operating member moves to the blade release position and when the blade lock control member moves to the second position. The blade lock pin may preferably be treated to prevent the adherence of dust.

In another aspect of the present teachings, the blade clamping position and the blade release position may be defined by a blade lock operating slot formed in the blade lock operating member. This blade lock operating slot may be L-shaped, although other shapes may be utilized. A first portion of the blade lock operating slot may extend in the circumferential direction of the blade lock operating member. Ends of the first portion of the blade lock operating slot may define the first and second positions of the blade lock control member. A second portion of the blade lock operating slot may extend in the longitudinal direction of the blade. Preferably, the first and second portions of the blade lock operating slot are connected with each other.

An auxiliary sleeve may be integrated with the rod and the auxiliary sleeve may contact a shoulder portion of the blade mounted within the blade receiving slot. The auxiliary sleeve may be fixed to the rod by means of an auxiliary pin that connects the auxiliary sleeve to the rod.

In another aspect of the present teachings, blade mounting devices may include a rod having a saw blade receiving slot. A sleeve or collar may be rotatably supported by the rod and have an L-shaped slot formed within the collar. A first portion of the L-shaped slot preferably extends radially with respect to the rod. A second portion of the L-shaped slot preferably extends longitudinally with respect to the slot. A pin may be received within the L-shaped slot and may be biased towards a forward end of the saw blade receiving slot. The pin may radially move along the first portion of the L-shaped slot when the collar is rotated with respect to the rod. Further, the pin preferably moves longitudinally with respect to the blade mounting device along the second portion of the L-shaped slot due to the biasing force when the pin reaches the second portion of the L-shaped slot.

The blade mounting device is preferably locked in a saw blade release position when the pin moves into the second portion of the L-shaped slot. Preferably, insertion of a saw blade into the blade mounting device causes the blade mounting device to automatically return to the blade clamping position. According to these features, the operator can change saw blades without being required to hold the blade mounting device in the blade release position. Further, the saw blade will be securely clamped within the blade mounting device by simply inserting the blade into the blade receiving slot. Thus, the operator is not required to operate the collar in order to securely fix the blade with respect to the slot.

The collar further may include a cam surface disposed along an interior portion of the collar. A pressing member is preferably urged towards the saw blade receiving slot by the cam surface. The pressing member may be, for example, a ball or pin. Preferably, rotation of the collar with respect to the rod causes the pressing member to press against a longitudinal face of the saw blade and thereby, securely attach the blade to the machine tool rod. Moreover, the collar preferably does not move or displace along the longitudinal axis of the rod when the collar is rotated.

In another aspect of the present teachings, blade mounting devices may include a rod having a saw blade receiving slot. The rod rotatably supports a collar. The collar preferably does not move or displace along the longitudinal axis of the rod when the collar is rotated from a blade clamping position to a blade release position. Further, means are provided for locking the collar in the blade release position. Thus, the operator is not required to hold the collar when changing saw blades in this embodiment as well.

In another aspect of the present teachings, blade mounting devices are taught that include a rod having a saw blade receiving slot. The slot preferably has a first portion of a first width or cross-section and a second portion of a second width or cross-section. The second width or cross-section is preferably greater than the first width. A control member may be slidably supported within the second portion of the saw blade receiving slot. The control member preferably has a width or cross-section that is greater than the first width or cross-section. Further, the control member is preferably biased towards the first portion of the saw blade receiving slot. A collar may be rotatably supported by the rod between a blade clamping position and a blade release position. Insertion of a saw blade into the first and second portions of the saw blade receiving slot while the collar is in the blade release position preferably pushes the control member rearward and causes the collar to automatically return to the blade clamping position.

The collar may include an L-shaped slot formed therein. A first portion of the L-shaped slot may extend radially with respect to the rod and a second portion of the L-shaped slot may extend longitudinally with respect to the rod. The control member may include a pin that is received within the L-shaped slot and the pin is preferably biased towards a forward end of the saw blade receiving slot. When the collar is rotated or moved radially with respect to the rod, the pin preferably moves radially along the first portion of the L-shaped slot. Further, when the pin reaches the second portion of the L-shaped slot, the pin will move along the second portion of the L-shaped slot due to the biasing force applied to the control member.

In another aspect of the present teachings, blade mounting devices may include means for clamping a saw blade by pressing a longitudinal face of the saw blade. Thus, the saw blade can be securely fixed to a rod by a pressing force against the flat or broad side of the saw blade. In addition, the blade mounting device preferably includes means for locking the apparatus in a blade release position. Thus, the operator is not required to hold the blade mounting device in order to change saw blades. Thus, in this aspect blade mounting devices are convenient to use and reliably secure the saw blade to the machine tool during operation.

Although the term "blade mounting device" is used throughout this specification, this term is also intended to mean devices such as keyless blade clamps and tool-less blade clamps. Moreover, the blade mounting devices that are described herein are generally considered to be connectors and can be utilized to conveniently and reliably secure a variety of substantially flat objects, such as a saw blade, within a slot, such as a saw blade receiving slot. Thus, the present teachings are not limited to apparatus for connecting a saw blade to a reciprocating saw, but may find use in a variety of other applications.

Each of the additional features and method steps disclosed above and below may be utilized separately or in conjunction with other features and method steps to provide improved blade mounting devices and tool-less blade clamps. Representative examples of the present teachings, which examples utilize many of these additional features and method steps in conjunction, will now be described in detail with reference to the drawings. This detailed description is merely intended to teach a person of skill in the art further details for practicing preferred aspects of the present teachings and is not intended to limit the scope of the invention.

Only the claims define the scope of the claimed invention. Therefore, combinations of features and steps disclosed in the following detail description may not be necessary to practice the invention in the broadest sense, and are instead taught merely to particularly describe some representative examples of the invention, which detailed description will be given with reference to the accompanying drawings. In addition, the present teachings clearly contemplate that features from one embodiment may be combined with features from another embodiment in order to create additional embodiments, which additional embodiments need not be specifically recited, because such combinations are well within the understanding of a person of ordinary skill in the art.

Figure 2:
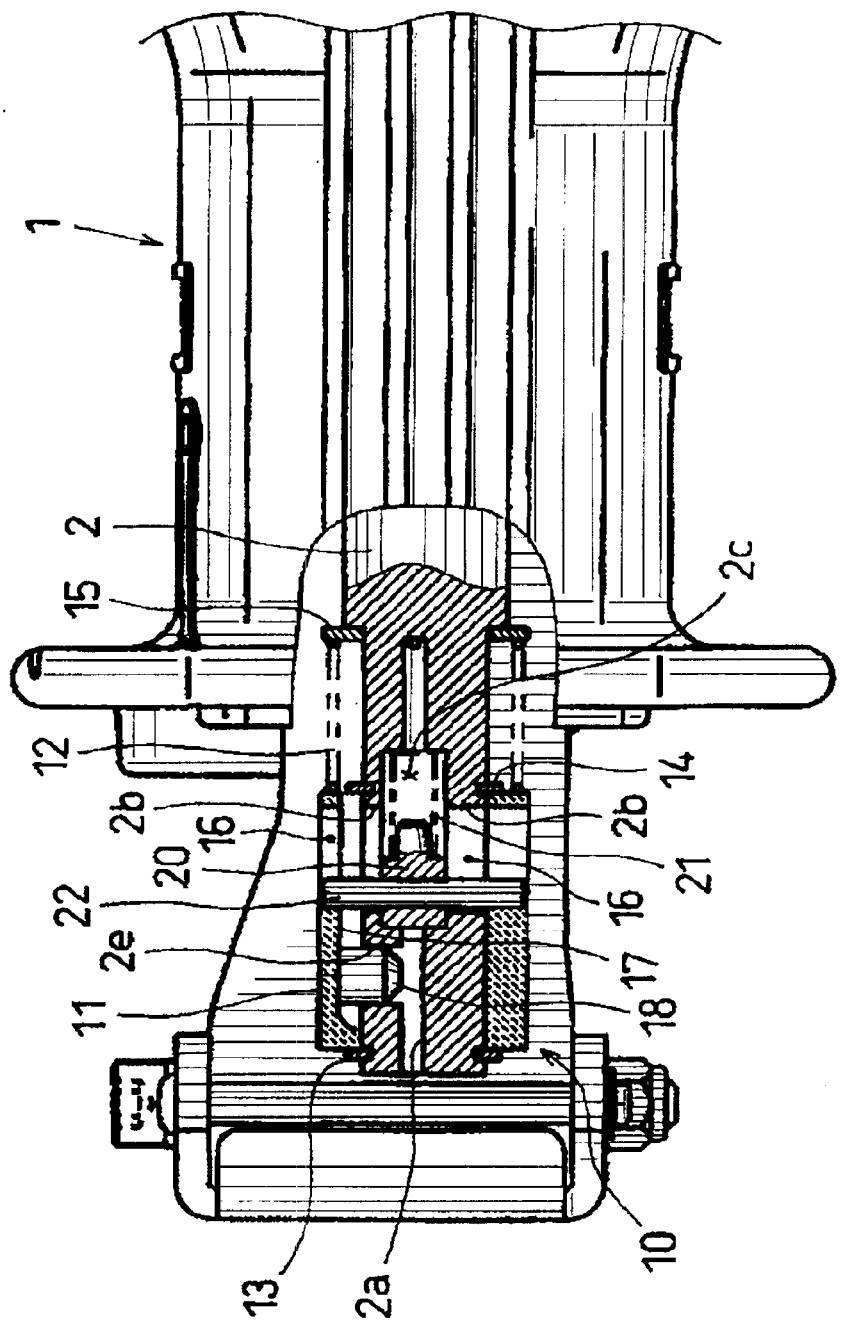
FIG. 2 shows a plan view of the first representative blade mounting device.

The first representative embodiment relates to a reciprocating saw 1 and FIGS. 1 and 2 show the front end portion of the reciprocating saw 1. The reciprocating saw 1 uses an electric motor (not shown in the drawings) to supply a reciprocating driving force, although other driving means may be utilized with the present teachings. The reciprocating saw 1 further includes an axially reciprocating rod 2.

The first representative blade mounting device 10 includes a blade lock operating sleeve 11, a torsion spring 12, a control member 20 and a blade clamping pin 18. The blade lock operating sleeve 11 is rotatably mounted on the front end of the rod 2. The blade lock operating sleeve 11 is also referred to herein as a collar or clamp collar and is preferably a generally tubular structure having an outer surface, an inner surface and a hollow interior. The spring 12 biases the blade lock operating sleeve 11 towards a blade clamping position. The blade lock control member 20 can move between a first or blade lock preventing position, which position prevents the blade lock operating sleeve 11 from rotating toward the blade clamping position, and a blade lock permitting position, which position permits the blade lock operating sleeve 11 to rotate toward the blade clamping position. The control member 20 is normally biased toward the blade lock preventing position by spring 21. The control member 20 will move to the blade lock permitting position when the blade lock control member 20 is pushed by a blade 3 that has been inserted into the rod 2, as will be discussed in further detail below. The blade 3 includes a base 3b having a first edge 19, a second opposing edge 25, and a longitudinal face 23 defined between the first edge 19 and the second opposing edge 25. After the blade lock operating sleeve 11 has rotated to the blade clamping position, the blade clamping pin 18 engages a blade lock hole 3a of the blade 3 to clamp (lock or fix) the blade 3 to the rod 2. The blade clamping pin 18 may preferably be made of SUJ (high-carbon chromium containing steel).

Figure 4:
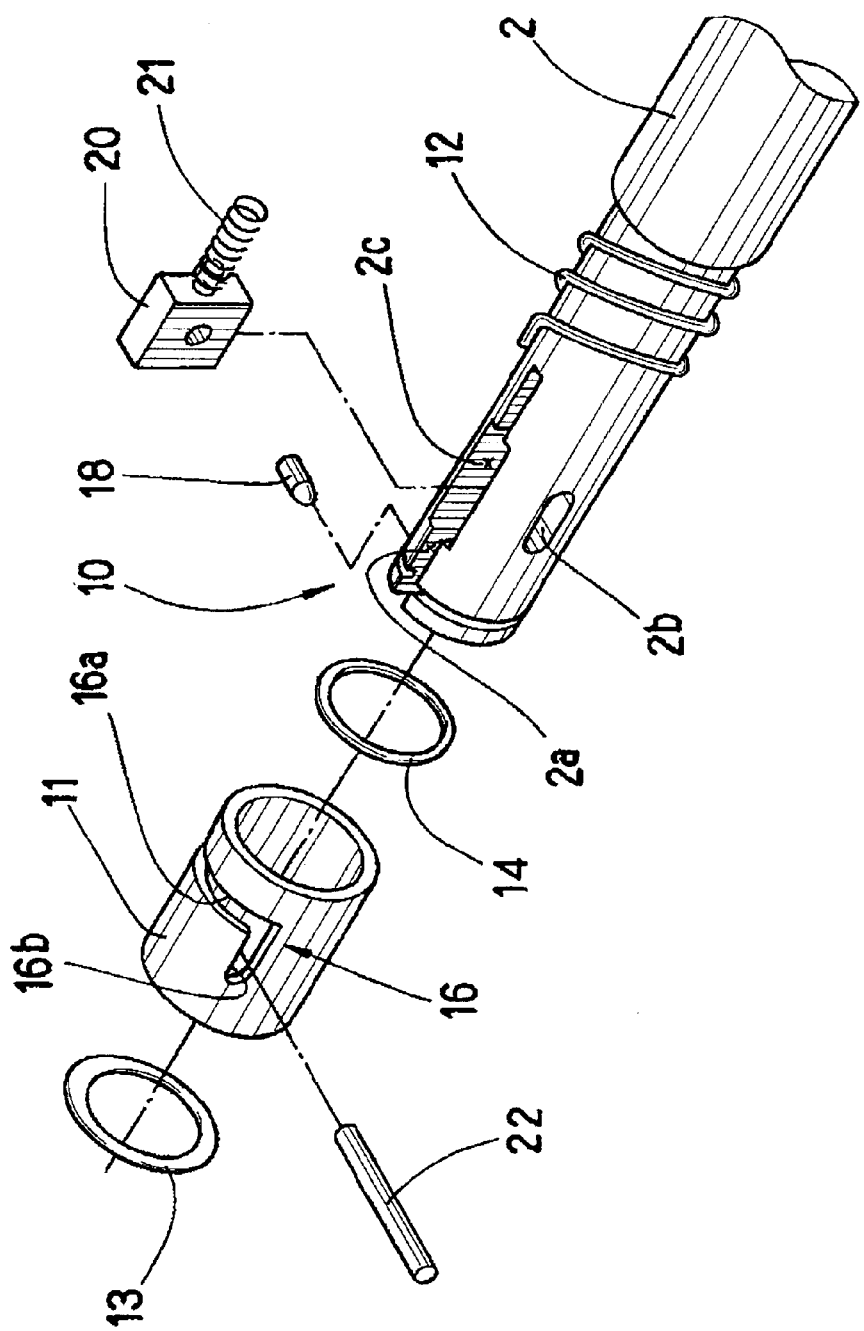
FIG. 4 is an exploded view showing various parts of the first representative blade mounting device.

As shown more clearly in FIG. 4, a slot 2a is formed at the front end portion of the rod 2 and is formed along the longitudinal axis of the rod 2. The slot 2a receives the base 3b of the blade 3. An indentation 2c is adjacent to the slot 2a and has a larger width or cross-sectional area than slot 2a. The blade lock control member 20 is disposed so as to move or slide along the longitudinal axis of the rod 2 within the indentation 2c. While control member 20 is shown as having a block or wedge form in FIG. 4, the control member 20 may have any shape that permits the control member 20 to slide within the indentation 2c.

A compression spring 21 biases the blade lock control member 20 toward the front end of the rod 2. A control pin 22 is inserted into the blade lock control member 20 and the respective ends of the control pin 22 protrude from the blade lock control member 20. As shown in FIG. 2, two guide slots 2b extend along the longitudinal axis of the rod 2 though opposite sides of the indentation 2c. The ends of the control pin 22 protrude radially through the respective guide slots 2b. The control member 20 moves within the range in which the respective ends of the control pin 22 move within the pair of guide slots 2b. When the blade 3 is inserted into slot 2a, the base 3b of the blade rearwardly pushes the blade lock control member 20. Therefore, the blade lock control member 20 moves to the rear portion of the indentation 2c and the control pin 22 moves to the rear portion of guide slot 2b.

Although a control pin 22 having two ends and a pair of guide slots 2b are utilized in the first representative embodiment, the control pin 22 may have more or less than two ends and the number of guide slots 2b may be adjusted according to the number of end(s) that protrude from control member 20.

Figure 3:
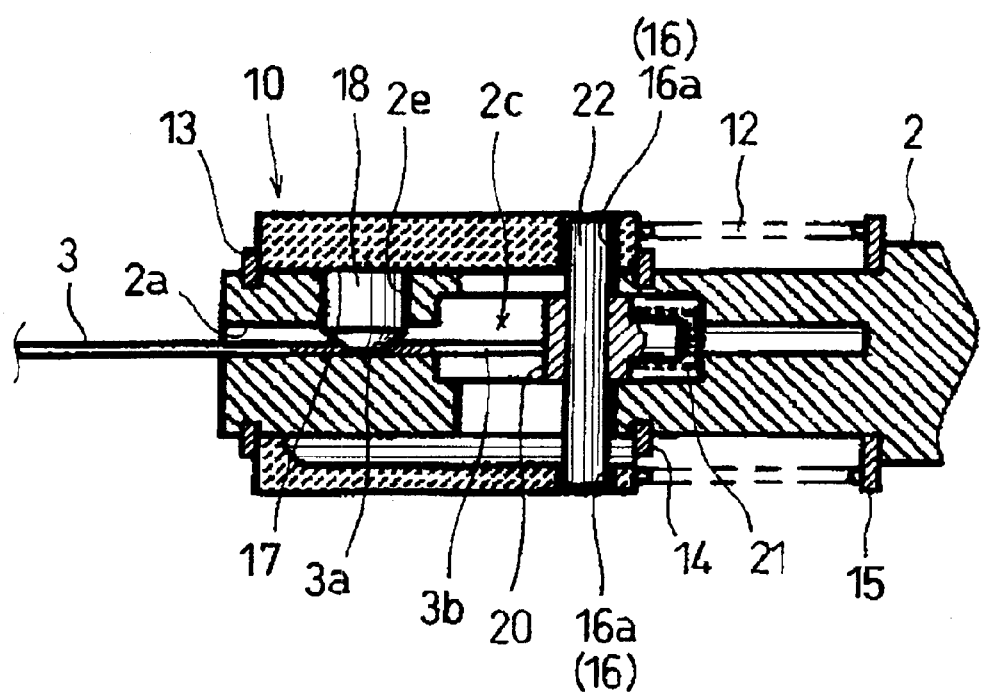
FIG. 3 shows a side view of the first representative blade mounting device.

As shown in FIGS. 2, 3 and 4, the outer circumference of the front end of the rod 2 rotatably supports the blade lock operating sleeve 11. More specifically, the blade lock operating sleeve 11 rotates about the longitudinal axis of the rod 2. Locking ring 13 is disposed around the rod 2 and is positioned at the front edge of the blade lock operating sleeve 11. Locking ring 14 also is disposed around the rod 2 and is positioned at the rear edge of the blade lock operating sleeve 11. Thus, the blade lock operating sleeve 11 is prevented from axially moving or displacing along the longitudinal axis of the rod 2.

The spring 12 is mounted between the rear surface of the blade lock operating sleeve 11 and a flange 15 that projects perpendicularly from the longitudinal axis of the rod 2. The blade lock operating sleeve 11 is biased toward the blade clamping position (counterclockwise in FIG. 5) by the spring 12.

Two L-shaped guide slots 16 are symmetrically formed with respect to each other in the circumferential surface of the blade lock operating sleeve 11. The respective end portions of the blade lock control pin 22 are inserted into the respective guide slots 16. Each guide slot 16 includes a blade lock control slot 16b, which extends axially along the longitudinal axis of the blade lock operating sleeve 11, and a blade clamp slot 16a, which extends radially with respect to the blade lock operating sleeve 11. Thus, the blade clamp slot 16a is preferably perpendicular to the blade lock control slot 16b and the slots 16a and 16b are joined at a corner portion. When the end portion of the blade lock control pin 22 is positioned within the blade lock control slot 16b, the blade lock operating sleeve 11 is prevented from rotating toward the blade clamping position. When the end portion of the blade lock control pin 22 is positioned within the blade clamp slot 16a, the blade lock operating sleeve 11 automatically rotates to the blade clamping position due to the biasing force of the spring 12. The length of the blade clamp slot 16a can be freely chosen and may be, for example, a length that prevents the spring 12 from being damaged by over-rotation.

Figure 5:
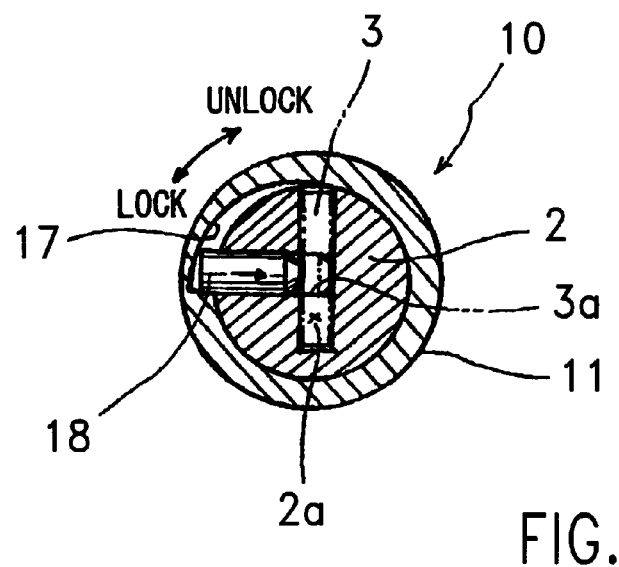
FIG. 5 shows a cross sectional view of the first representative blade mounting device along line (5)—(5) shown in FIG. 1.
Figure 6:
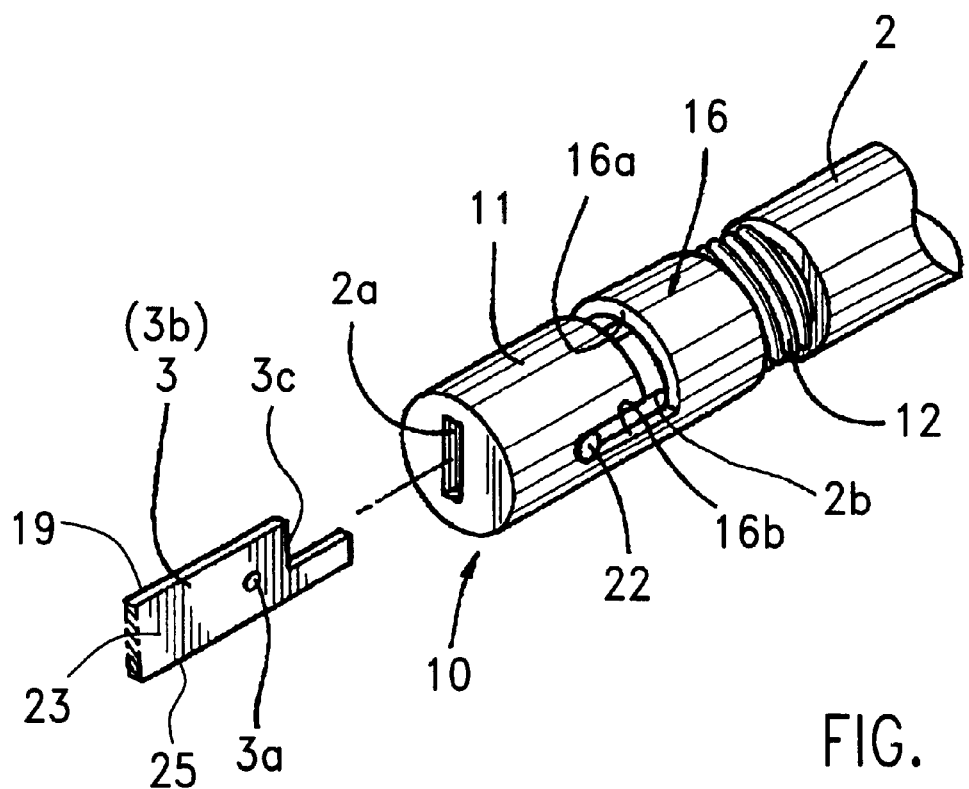
FIG. 6 shows a perspective view of the blade being inserted into the first representative blade mounting device.
Figure 7:
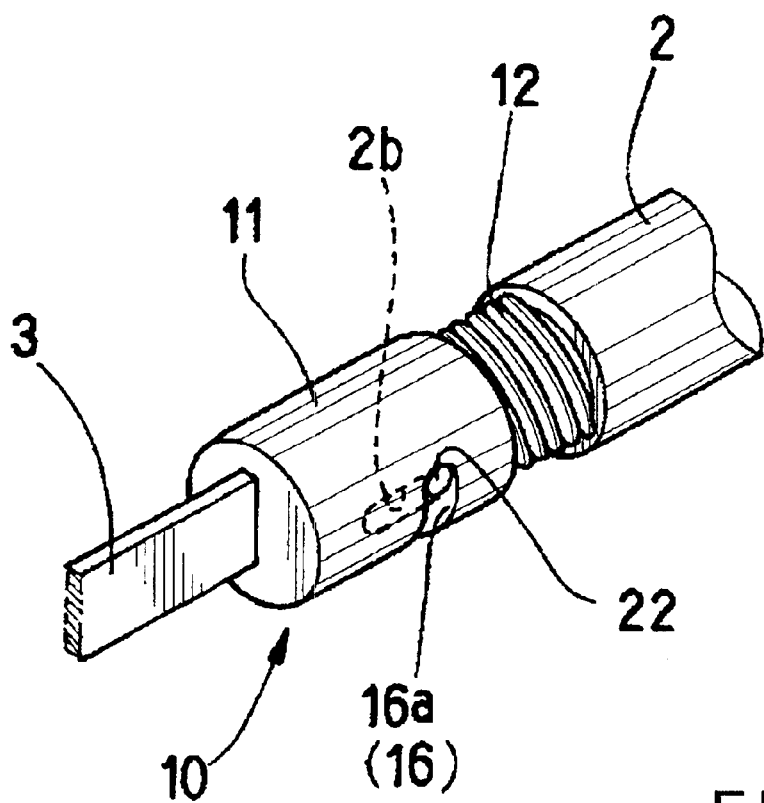
FIG. 7 shows a perspective view of the blade mounted within the first representative blade mounting device.

As shown in FIG. 5, a cam face 17 is formed on the inner circumferential surface of the blade lock operating sleeve 11 and has a gradually increasing internal diameter along one portion of cam face 17. As shown in FIGS. 2 and 3, an aperture or hole 2e is formed in the rod 2 and slidably supports and guides the blade clamping pin 18. Further, the blade clamping pin 18 can move radially with respect to the rod 2. When the sleeve 11 is rotated counterclockwise as shown in FIG. 5, the blade clamping pin 18 moves inwardly toward the center of the rod 2, i.e. in the direction of the arrow shown inside pin 18, because the diameter of portion of the cam face 17 that contacts the blade clamping pin 18 becomes smaller. In other words, the inner diameter of the sleeve 11 along the longitudinal axis of the blade clamping pin 18 becomes relatively smaller. Therefore, the cam face 17 will push the blade clamping pin 18 towards the blade 3. As a result, the tip or end portion of the blade clamping pin 18 will project into the slot 2a, as shown by dotted lines in FIG. 5 and the blade clamping pin 18 will lock or clamp the blade 3 with respect to the rod 2.

If the sleeve 11 is rotated in the clockwise direction with respect to rod 2, the tip of the blade clamping pin 18 will withdraw from the slot 2a, as shown by the solid line in FIG. 5. That is, when the blade lock operating sleeve 11 is rotated to the blade release position (clockwise in FIG. 5), the diameter of the portion of the cam face 17 that contacts the blade clamping pin 18 will increase, because the inner diameter of the sleeve 11 along the longitudinal axis of the blade clamping pin 18 becomes relatively larger. Thus, the blade clamping pin 18 is not actively pushed into the slot 2a and the blade lock pin 18 can be withdrawn from slot 2a. In this state, the base 3b of the blade 3 can be inserted into or withdrawn from the slot 2a.

As shown in FIGS. 1 and 2, the blade lock control member 20 is normally positioned at the front end of the indentation 2c due to the biasing force of the spring 21. With the blade lock control member 20 located at the front end of the indentation 2c, the end of the blade lock control pin 22 is positioned at the front end of the blade lock control slot 16b. The blade lock operating sleeve 11 is locked in the blade release position and therefore, the blade clamping pin 18 does not press against the blade 3 as shown in FIG. 5. Thus, the base 3b of the blade 3 may be inserted into or withdrawn from the slot 2a. Because the sleeve 11 is locked in the blade release position, due to the blade clamping pin 18 being disposed within the blade lock control slot 16, the operator is not required to manually hold the sleeve 11 in the blade release position. Therefore, the operation for withdrawing or inserting the blade 3 into rod 2 can be simplified over known blade mounting devices, because the sleeve 11 is automatically locked in the blade release position.

When the base 3b of the blade 3 is inserted and pressed into the slot 2a, the base 3b pushes the blade lock control member 20 inwardly toward the inner part of the indentation 2c (i.e. towards the rear of the rod 2) against the biasing force of the spring 21. Because the blade lock control member 20 is moved inwardly, the control pin 22 also moves toward the rear end of the blade lock control slot 16b. The rear end of the blade lock control slot 16 is continuous with one lateral end of the blade lock slot 16a. Thus, if the operator is not holding the sleeve 11, the blade lock control pin 22 will enter the blade clamp slot 16a and the blade lock operating sleeve 11 will automatically rotate to the blade clamping position due to the biasing force of the spring 12. Thus, the operation for inserting and clamping the blade 3 in the rod 2 is remarkably simple, because the operation of pushing the blade 3 into slot 2a automatically causes the pin 22 to move rearwardly and then shift to the blade clamp slot 16a. Further, because the spring 12 biases the sleeve 11 towards the blade clamping position, the sleeve 11 will automatically rotate to the blade clamping position when the pin 22 reaches the blade clamp slot 16a. Thus, the blade 3 can be clamped or locked in position with respect to the rod 2 by simply inserting the blade 3 into the slot 2a.

When the blade lock operating sleeve 11 rotates to the blade clamping position, the inner diameter of the blade lock operating sleeve 11 becomes smaller, because the cam face 17 has a decreasing diameter in the clockwise direction as shown in FIG. 5. Therefore, the tip end of the blade clamping pin 18 is pushed into the slot 2a. As a result, the base 3b of the blade 3 may not be removed from the slot 2a and the blade 3 is securely attached to the rod 2. That is, the biasing force of spring 12 is applied to the blade 3 via the sleeve 11 and the blade clamping pin 18 in order to prevent the blade from loosening during a cutting operation due to vibrations.

In order to remove or withdraw the blade 3 from the rod 2, the blade lock operating sleeve 11 is rotated to the blade release position against the biasing force of the spring 12. The control pin 22 moves to the junction between the blade lock slot 16a and the blade lock control slot 16b. As a result, the spring 21 will push or bias the control member 20 toward the end of the blade lock operating sleeve 11. Further, the cam face 17 shown in FIG. 5 rotates clockwise to increase the inner diameter of the blade lock operating sleeve 11. Thus, the pin 18 does not actively press against the blade 3 and the blade hole 3a is no longer locked or clamped by the blade clamping pin 18. In other words, the control member 20 moves forward due to the biasing force of the spring 21 and at the same time the lock pin 18 unlocks the blade 3. Because the rear end of the blade 3 abuts the control member 20, the blade 3 will be pushed out of the slot 2a when the control member 20 moves forward due to the biasing force of spring 21. This feature may help to remove a saw blade 4 that has broken during a cutting operation. As shown in FIG. 5, the tip end of the blade clamping pin 18 may be tapered in order to permit the blade clamping pin 18 to be easily detached from the blade 3.

According to the first representative blade mounting device 10, when the base 3b of the blade 3 is inserted and pressed into the slot 2a, the blade lock control member 20 is withdrawn, the blade lock operating sleeve 11 automatically rotates to the blade clamping position and the blade clamping pin 18 clamps or fix the blade 3 with respect to the rod 2. In other words, the blade 3 may be attached to the rod 2 simply by inserting the blade 3 into the rod 2. Further, when the blade 3 is removed from the rod 2, the spring 21 forwardly biases the blade lock control member 20 and pushes the blade 3 towards the front of the reciprocating saw 1. Thus, because the control member 20 actually pushes the blade 3 out of the slot 2a when the control member 20 moves forward, the blade 3 can be easily removed from the rod 2, even if the blade 3 has broken during operation.

In the first representative embodiment, the blade clamping pin 18 may be replaced with another pressing member, such as a bearing or a ball. Moreover, the representative blade mounting device 10 may also be utilized with reciprocating cutting implements other than a reciprocating saw, such as a jigsaw or any other tool that requires a substantially flat member to be inserted into and fixed within a slot formed within a rod.

Figure 8:
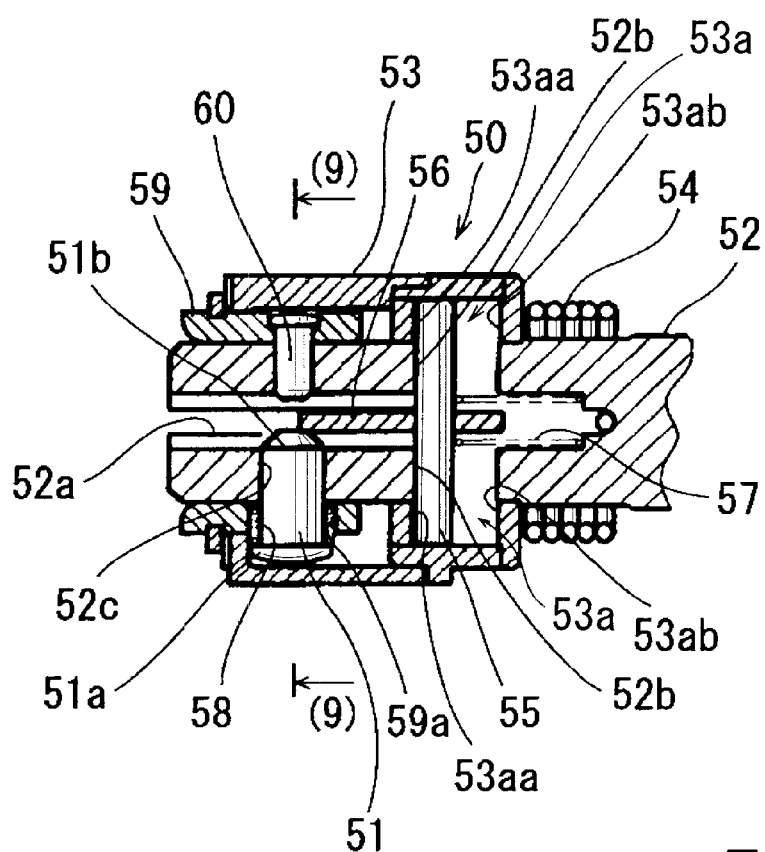
FIG. 8 shows a second representative blade mounting device.
Figure 9:
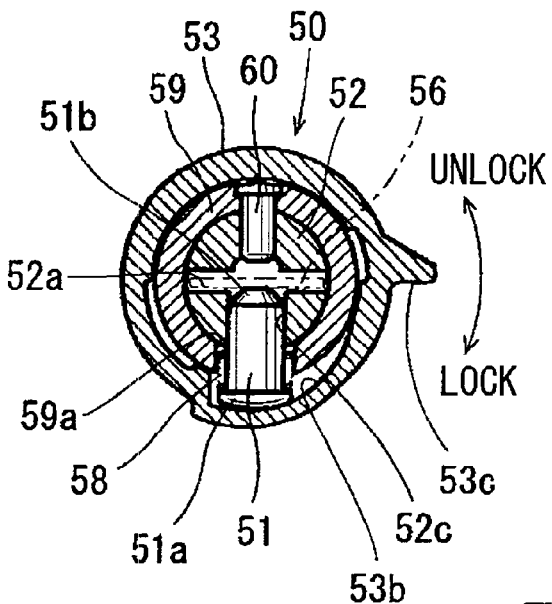
FIG. 9 shows a cross sectional view of the second representative blade mounting device along line (9)—(9) shown in FIG. 8.
Figure 10:
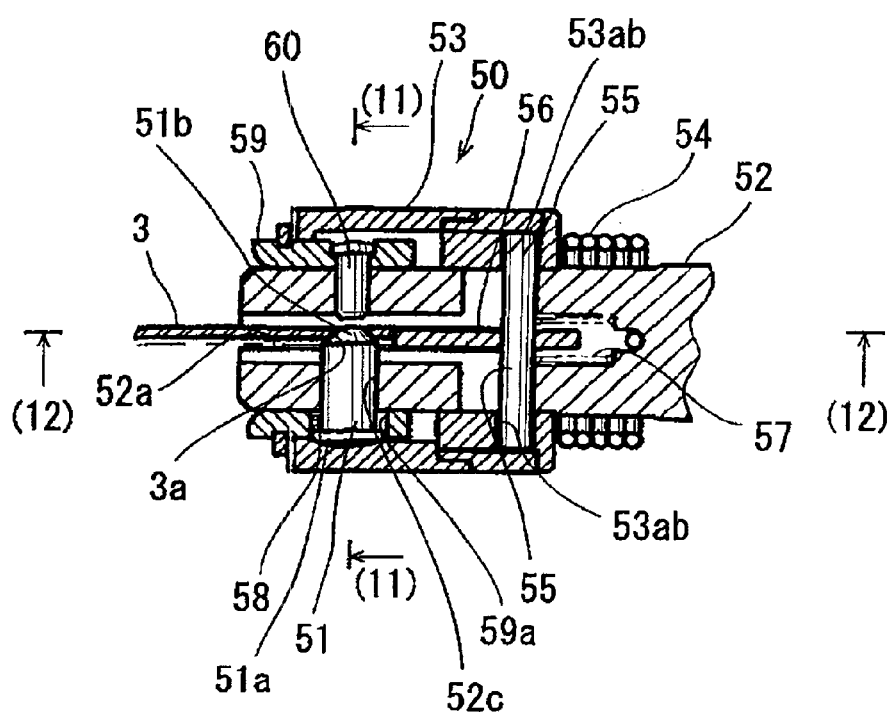
FIG. 10 shows a side view of the second representative blade mounting device.

If the first representative blade mounting device 10 is used in a dusty workplace, the introduction of dust into the blade lock operation sleeve 11 may possibly impair the smooth removal of the blade 3 from the rod 2. In order to prevent dust from impairing the blade removal operation, the second representative embodiment shown in FIGS. 8 through 12 includes a blade clamping pin 51 that has been treated to prevent dust and/or other particulate matter from adhering to the blade clamping pin 51. As shown in FIGS. 8 through 10, the blade mounting device 50 according to the second representative embodiment is attached to a rod 52 of a reciprocating saw 1. The blade mounting device 50 includes a blade lock operating sleeve 53, a spring 54, a blade lock control member 56 and a blade clamping pin 51.

Similar to the first representative embodiment, the blade lock operating sleeve 53 is rotatably attached to the front end of the rod 52. The spring 54 biases the blade lock operation sleeve 53 toward the blade clamping position. The control member 56 can move between a blade lock preventing position, which prevents the blade lock operating sleeve 53 from rotating toward the blade clamping position, and a blade lock permitting position, which permits the blade lock control sleeve 53 to rotate toward the blade clamping position. The blade clamping pin 51 is slidably supported within the hole or aperture 52c and positioned to engage the blade lock hole 3a of the blade 3. When the blade lock operating sleeve 53 has rotated to the blade clamping position, the blade clamping pin 51 preferably locks or clamps the blade 3 to the rod 52.

A spring 57 disposed within a slot 52a biases the blade lock control member 56 toward the front end of the rod 52 (to the left in FIG. 8). A blade lock control pin 55 is attached to the control member 56. The blade lock control pin 55 protrudes toward the side of the rod 52 through a pair of guide slots 52b that are formed on respective sides of the rod 52. The guide slots 52b extend along the longitudinal axis of the rod 52. When the blade lock control pin 55 moves along the respective guide slots 52b, the blade lock control member 56 moves axially with respect to the rod 52. Each end of the clamp control pin 55 protrudes toward the side of the rod 52 and engages a respective guide slot 53a that is disposed on the inner circumferential surface of the blade lock operating sleeve 53. The control member 56 may preferably be cylindrical in cross-section in this embodiment.

The end portion of the rod 52 rotatably supports the blade lock operating sleeve 53. The spring 54 is attached between the blade lock operating sleeve 53 and the rod 52. The spring 54 biases the blade lock operating sleeve 53 toward the blade clamping position (clockwise in FIGS. 9 and 11). Two guide slots 53a are symmetrically formed with respect to a point on the inner circumferential surface of the rear side of the blade lock operating sleeve 53. Each guide slot 53a includes a blade lock control slot 53aa that extends along the longitudinal axis of the rod 52 and a blade lock slot 53ab that extends laterally or radially with respect to the rod 52. As shown in FIG. 8, when the blade lock control pin 55 is positioned within the blade lock control slot 53aa, the blade lock operating sleeve 53 is prevented from rotating. When blade lock control pin 55 is positioned in the blade lock slot 53ab, the blade lock operating sleeve 53 can rotate with respect to the rod 52. The guide slots 53a of the second representative embodiment are preferably formed in the inner circumference of the blade lock operating sleeve 53, so that the guide slots 53a can not be seen from the outside.

Figure 11:
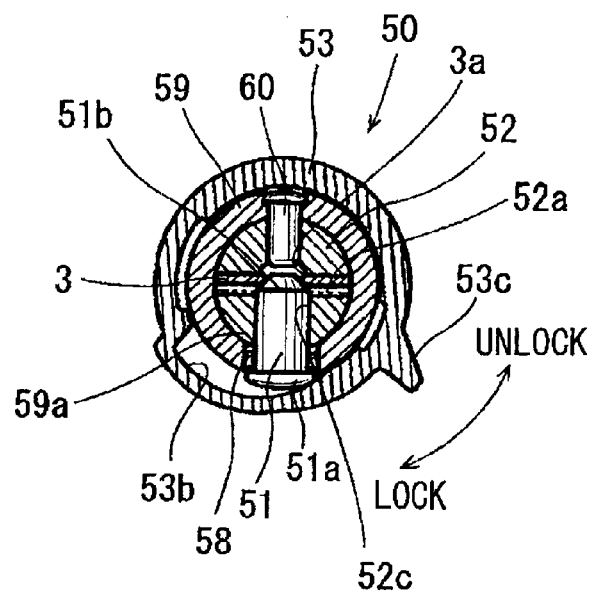
FIG. 11 shows a cross sectional view of the second representative blade mounting device along line (11)—(11) shown in FIG. 10.

As shown in FIGS. 9 and 11, the inner diameter of the blade lock operating sleeve 53 may include a cam face 53b having a varying inner diameter. A head portion of the blade clamping pin 51 is positioned adjacent to the cam face 53b. A spherical flange 51a is formed on the head portion of the blade clamping pin 51 and makes point contact with the cam face 53b. The blade clamping pin 51 is slidably supported by a support hole 52c formed on the rod 52.

A spring 58 is disposed between the flange 51a of the blade clamping pin 51 and the rod 52. The spring 58 outwardly biases the blade clamping pin 51 from a slot 52a (the downward direction as shown in FIGS. 8–11). The end portion of the blade clamping pin 51 is preferably tapered. As shown in FIGS. 10 and 11, the tapered portion 51b may guide the blade clamping pin 51 into the blade lock hole 3a of the blade 3.

The surface of the blade clamping pin 51 may be preferably treated with electroless nickel plating. The surface of the blade clamping pin 51 also may be polished so that any grooves or scratches on the surface are smaller or finer than the size of dust and/or other particulate matter that are generated during the use of machine tool. Therefore, dust and/or particulate matter preferably does not adhere to the surface of the blade clamping pin 51.

Moreover, a knob 53c may be optionally provided that protrudes or projects from the exterior surface of the blade lock operating sleeve 53. Therefore, the blade lock operating sleeve 53 can be easily rotated by utilizing the knob 53b.

An auxiliary sleeve 59 also may be disposed between the rod 52 and the blade lock operating sleeve 53. An auxiliary pin 60 may be disposed between the auxiliary sleeve 59 and the rod 52. The auxiliary sleeve 59 and the rod 52 may be integrally formed and preferably have a unitary or seamless construction. The blade clamping pin 51 is inserted into the support hole 52c through a hole 59a of the auxiliary sleeve 59. The hole 59a preferably has an inner diameter that is larger than the diameter of the blade clamping pin 51. The spring 58 is positioned within the hole 59a.

Figure 12:
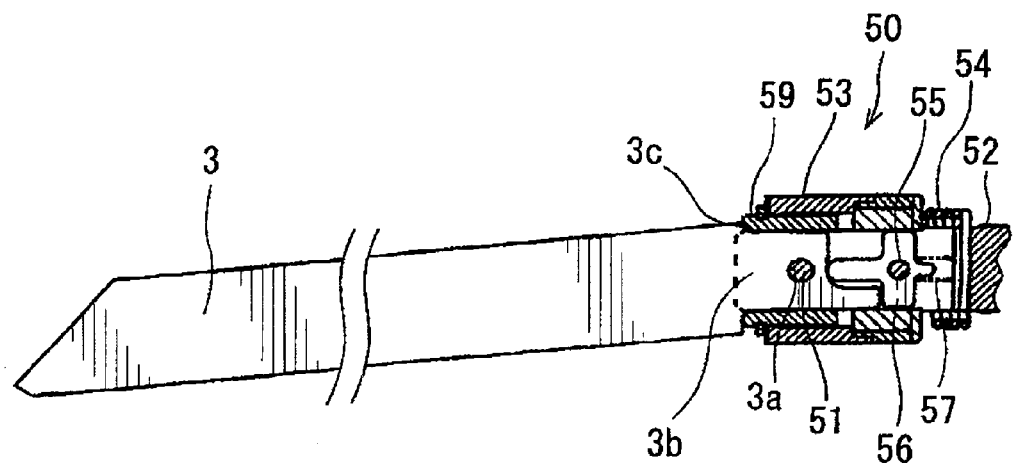
FIG. 12 shows a cross sectional view of the second representative blade mounting device along line (12)—(12) shown in FIG. 10.
Figure 13:
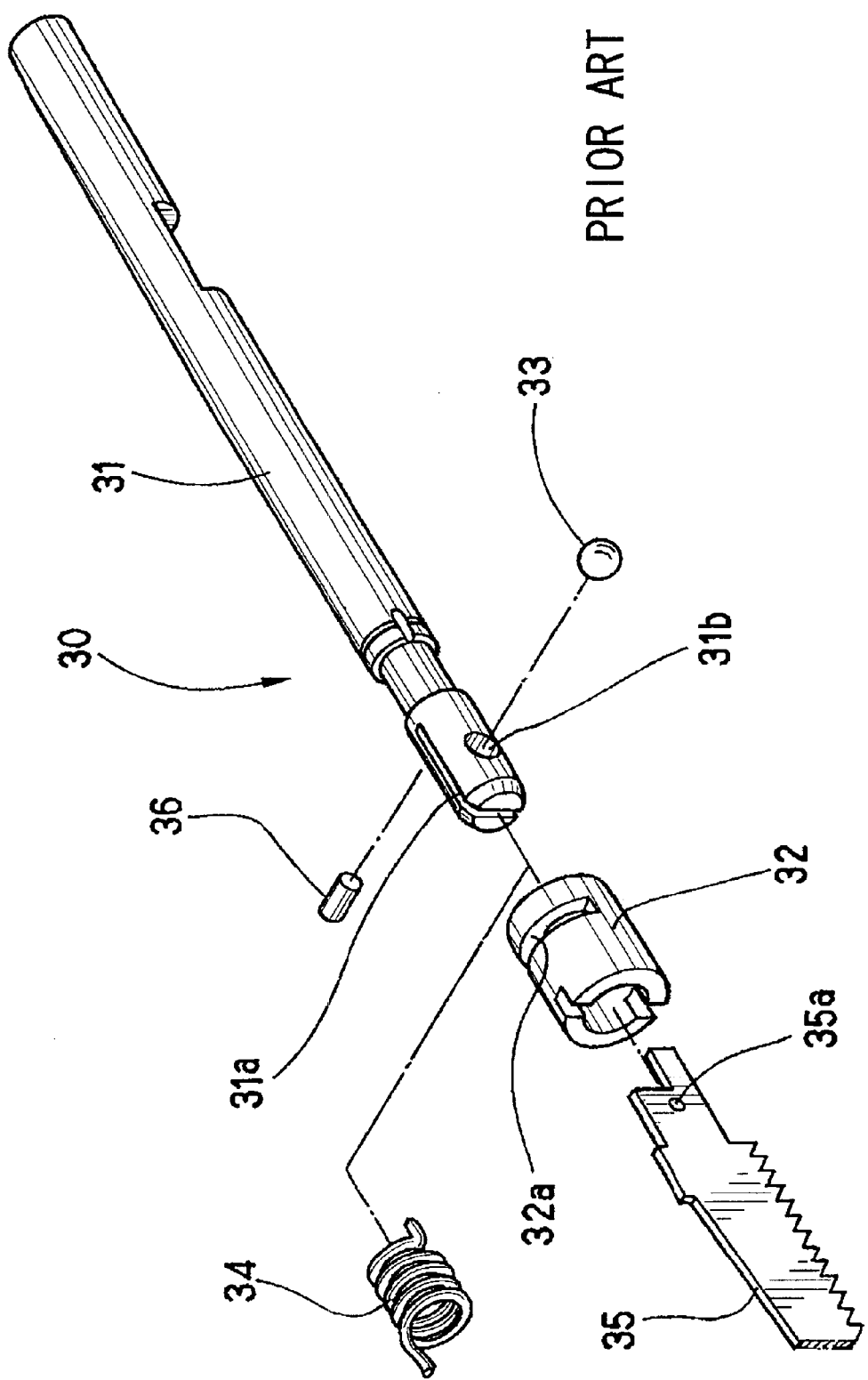
FIG. 13 shows a known blade mounting device.

As shown in FIG. 12, a shoulder 3c of the blade 3 contacts the front surface (i.e., the left surface in FIGS. 8 and 10) of the auxiliary sleeve 59 and therefore, the blade 3 can be stably and reliably mounted. During operation of the reciprocating saw 1, vibrations and/or the cutting resistance exerted on the blade 3 may be received by the auxiliary sleeve 59 without transmitting such vibrations and/or the cutting resistance to the blade clamping pin 51. In other words, outside forces preferably are not transmitted to the blade clamping pin 51 due to the auxiliary sleeve 59 that is integrated with the rod 52. Therefore, smooth movement of the blade clamping pin 51 can be ensured.

When a cutting operation is performed by utilizing a reciprocating saw 1 with the representative blade mounting device 50, fine dust and shavings (and other particulate matter) having a diameter of one micron or less may possibly intrude into the blade mounting device 50. If the blade clamping pin 51 is treated with electroless nickel plating, however, dust and other particulate matter will not adhere to the blade clamping pin 51. Therefore, the resistance of the blade clamping pin 51 rubbing against hole 52c will not increase. Thus, the blade 3 can be reliably inserted into or removed from the slot 52a, even if dust and/or other particulate matter has become lodged within the gap between the support hole 52c and the blade clamping pin 51.

Further representative treatments of blade clamping pin 51 for preventing the adherence of dust include, but are not limited to, surface hardening treatments such as gas nitrocarburizing or carburizing, plating treatments such as hot-dip plating or vapor deposition plating, polishing processes, electrolytic polishing processes, chemical polishing processes, or one or more combinations of these treatments. Thus, representative treatments are not limited to electroless nickel plating.

By reducing the surface coarseness (roughness of the surface) of the blade clamping pin 51 to be smaller or finer than the size of particulate matter and/or by hardening the surface of the blade clamping pin 51, fine dust and other particulate matter can be prevented from adhering to the blade clamping pin 51.

What is claimed is:

1. A keyless blade clamp comprising:
   a rod having a saw blade receiving slot,
   a collar rotatably supported by the rod, means for preventing the collar from moving along the longitudinal axis of the rod when the collar is rotated from a blade clamping position to a blade release position, and
   means for locking the collar in the blade release position.

2. A keyless blade clamp as in claim 1, wherein said preventing means comprises a slot formed in the collar and the means for locking the collar in the blade release position comprises a pin that travels in the slot.

3. A keyless blade clamp as in claim 2, further comprising a first spring attached to the rod and the collar, wherein the spring normally biases the collar toward the blade clamping position.

4. A keyless blade clamp as in claim 3, further comprising a second spring that normally biases the pin toward the blade release position.

5. A keyless blade clamp as in claim 4, wherein the means for locking the collar in the blade release position comprises an operating member disposed within the saw blade receiving slot, the pin being coupled to the operating member and the second spring normally biases the operating member toward the blade release position.

6. A keyless blade clamp as in claim 5, wherein insertion of a saw blade into the saw blade receiving slot pushes the operating member against the biasing force of the second spring, wherein the means for locking the collar in the blade release position is released and the first spring automatically returns the collar to the blade clamping position.

7. A keyless blade clamp as in claim 6, wherein an inner surface of the collar comprises a cam surface and the keyless blade clamp further comprises a blade clamping pin slidably supported by an aperture in the rod, wherein rotation of the collar about the rod towards the blade clamping position causes the blade clamping pin to be urged towards the saw blade receiving slot.

8. A keyless blade clamp as in claim 7, wherein the blade clamping pin comprises a tapered end that is adapted to engage a hole formed in the saw blade in order to securely attach the saw blade to the rod.

9. A keyless blade clamp as in claim 8, further comprising an auxiliary sleeve attached to the rod, wherein the auxiliary sleeve is arranged and constructed to contact a shoulder portion of the saw blade when the saw blade is inserted into the saw blade receiving slot.

10. A keyless blade clamp as in claim 9, wherein the blade clamping pin has been treated to minimize adherence of dust to the blade clamping pin.

11. A keyless blade clamp as in claim 10, wherein the auxiliary sleeve is attached to the rod by an auxiliary pin.

12. A blade mounting device comprising:
    means for clamping a saw blade within a slot formed in a rod by pressing a longitudinal face disposed between opposing edges of a base portion of the saw blade and
    means for locking the blade mounting device in a blade release position.

13. A blade mounting device as in claim 12, wherein the means for locking the blade mounting device in a blade release position is released by inserting the saw blade into the slot.

14. A blade mounting device as in claim 13, wherein the clamping means further comprises means for automatically clamping the saw blade within the slot after the means for locking the blade mounting device has been released.

15. A blade mounting device as in claim 14, wherein the clamping means comprises a pressing member slidably supported within an aperture formed within the rod, the aperture communicating with the slot.

16. A blade mounting device as in claim 15, wherein the clamping means further comprises a sleeve rotatably supported by the rod, wherein a cam surface is defined on an inner surface of the sleeve and the cam surface urges the pressing member towards the slot when the sleeve is rotated about the rod.

17. A blade mounting device as in claim 16, wherein the pressing member comprises a pin having a tapered end adapted to engage a hole in the saw blade.

18. A blade mounting device as in claim 17, wherein the locking means comprises a spring that normally biases the locking means towards the blade release position.

19. A blade mounting device as in claim 18, wherein the sleeve comprises a slot and the pin is received within the slot of the sleeve, wherein the pin is normally biased towards the blade release position by the spring.

20. A blade mounting device as in claim 19, wherein the slot of the sleeve is L-shaped.

21. A blade mounting device adapted to mount a blade in a blade receiving slot formed in a rod of a machine tool comprising:
    a blade lock operating member that moves between a blade clamping position and a blade release position, wherein the blade lock operating member is normally biased towards the blade clamping position,
    a blade lock control member that moves between a first position and a second position, wherein the blade lock control member prevents the blade lock operating member from moving to the blade clamping position when the blade lock control member is located in the first position and the blade lock control member permits the blade lock operating member to move to the blade clamping position when the blade lock control member is located in the second position, wherein the blade lock control member is automatically moved from the first position to the second position when the blade is inserted into the blade receiving slot and
    means for clamping the blade within the blade receiving slot when the blade locking operating member is in the blade clamping position, wherein the clamping means presses a longitudinally extending face disposed between opposing edges of a base portion of the blade against a longitudinally extending face of the blade receiving slot.

22. A blade mounting device according to claim 21, wherein the blade lock operating member is rotatably supported by the rod and the blade lock operating member rotates about the rod between the blade clamping position and the blade release position.

23. A blade mounting device according to claim 21, further comprising a compression spring that biases the blade lock operating member towards the blade clamping position.

24. A blade mounting device according to claim 21, wherein the blade lock operating member comprises a blade lock operating sleeve rotatably disposed around a front end of the rod and the blade lock operating sleeve rotates between the blade clamping position and the blade release position about the outer circumferential surface of the rod.

25. A blade mounting device according to claim 21, wherein the clamping means comprises a blade lock pin that engages with a blade lock hole disposed within a base portion of the blade and the blade lock operating member further comprises a cam surface disposed within the inner surface of the blade lock operating member, wherein the cam surface urges the blade lock pin to engage with or release from the blade lock hole due to rotation of the blade lock operating member about the rod.

26. A blade mounting device according to claim 21, wherein the blade lock control member is biased towards the second position by a torsion spring.

27. A blade mounting device according to claim 21, wherein the clamping means comprises a blade lock pin that engages with a blade lock hole disposed within a base portion of the blade and the blade lock pin has a tapered surface that assists the release of the blade lock pin from the blade lock hole when the blade control member is rotated to the first position.

28. A blade mounting device according to claim 21, wherein the clamping means comprises a blade lock pin that engages with a blade lock hole disposed within a base portion of the blade and the blade lock pin is biased so as to be released from the blade lock hole when the blade lock operating member moves to the blade release position and when the blade lock control member moves to the second position.

29. A blade mounting device according to claim 21, wherein the blade clamping position and the blade release position of the blade lock operating member are defined by a blade lock operating slot disposed on the blade lock operating member and the blade lock operating slot extends in the circumferential direction of the blade lock operating member and wherein the first and second positions of the blade lock control member are defined by a blade lock control slot disposed on the blade lock operating member and the blade lock control slot extends in the longitudinal direction of the blade.

30. A blade mounting device according to claim 29, wherein the blade lock operating slot and the blade lock control slot are connected with each other.

31. A blade mounting device according to claim 21, wherein the clamping means comprises a blade lock pin that engages with a blade lock hole disposed within a base portion of the blade and the blade lock pin has been treated to prevent the adherence of dust.

32. A blade mounting device according to claim 21, further comprising an auxiliary sleeve integrated with the rod, the auxiliary sleeve contacting a shoulder portion of the blade mounted in the blade receiving slot.

33. A blade mounting device according to claim 32, wherein an auxiliary pin attaches the auxiliary sleeve to the rod.

34. A keyless blade clamp arranged and constructed to attach a blade to a reciprocating rod of a machine tool comprising:
   a blade lock pin slidably supported within an aperture formed in the reciprocating rod, wherein the blade lock pin engages a blade lock hole disposed at a base portion of the blade when urged to a blade clamping position, wherein the blade lock pin has been treated to prevent the adherence of dust.

35. A keyless blade clamp as in claim 34, further comprising a collar rotatably supported by the rod, wherein the collar does not move along the longitudinal axis of the rod when the collar is rotated from the blade clamping position to a blade release position.

36. A keyless blade clamp as in claim 35, further comprising means for locking the collar in the blade release position.

37. A keyless blade clamp as in claim 36, wherein the means for locking the collar in the blade release position comprises an operating member disposed within a saw blade receiving slot formed in the rod, a pin is coupled to the operating member and a compression spring normally biases the operating member toward the blade release position.

38. A keyless blade clamp as in claim 37, wherein insertion of a saw blade into the saw blade receiving slot pushes the operating member against the biasing force of the compression spring, wherein the means for locking the collar in the blade release position is released and a torsion spring automatically returns the collar to the blade clamping position.

39. A keyless blade clamp as in claim 35, wherein an L-shaped slot is formed in the collar.

40. A keyless blade clamp as in claim 39, further comprising a control pin that travels in the L-shaped slot.

41. A keyless blade clamp as in claim 40, further comprising a torsion spring attached to the rod and the collar, wherein the spring normally biases the collar toward the blade clamping position.

42. A keyless blade clamp as in claim 41, further comprising a compression spring that normally biases the pin toward the blade release position.

43. A keyless blade clamp as in claim 35, wherein an inner surface of the collar comprises a cam surface and rotation of the collar about the rod towards the blade clamping position causes the blade lock pin to be urged towards a saw blade receiving slot formed in the rod.

44. A keyless blade clamp as in claim 34, wherein the blade lock pin comprises a tapered end that is adapted to engage a hole formed in the blade in order to securely attach the blade to the rod.

45. A keyless blade clamp as in claim 34, further comprising an auxiliary sleeve attached to the rod, wherein the auxiliary sleeve is arranged and constructed to contact a shoulder portion of the blade when the saw blade is inserted into a blade receiving slot defined in the reciprocating rod.

46. A keyless blade clamp as in claim 45, wherein the auxiliary sleeve is attached to the rod by an auxiliary pin.

47. A keyless blade clamp as in claim 46, further comprising:
   a collar rotatably supported by the reciprocating rod, wherein the collar does not move along the longitudinal axis of the reciprocating rod and an L-shaped slot is formed in the collar
   a pin that travels in the L-shaped slot
   a first spring attached to the rod and the collar, wherein the spring normally biases the collar towards a blade clamping position and
   a second spring that normally biases the pin toward a blade release position.

48. A keyless blade clamp as in claim 47, further comprising means for locking the collar in the blade release position comprising an operating member disposed within a saw blade receiving slot formed in the reciprocating rod, the pin being coupled to the operating member and the second spring normally biases the operating member toward the blade release position.

49. An apparatus comprising:
   a rod having a saw blade receiving slot,
   a collar rotatably supported by the rod and having an L-shaped slot, wherein a first portion of the L-shaped slot extends radially with respect to the rod and a second portion of the L-shaped slot extends longitudinally with respect to the slot and a pin received within the L-shaped slot, wherein the pin is normally biased towards a forward end of the saw blade receiving slot, wherein the pin radially moves along the first portion of the L-shaped slot when the collar is rotated with respect to the rod and wherein the pin is biased along the second portion of the L-shaped slot when the pin reaches the second portion of the L-shaped slot.

50. An apparatus as in claim 49, wherein the apparatus is locked in a saw blade release position when the pin reaches the second portion of the L-shaped slot.

51. An apparatus as in claim 49, wherein insertion of a saw blade into the apparatus automatically causes the apparatus to move to a saw blade clamped position.

52. An apparatus as in claim 49, wherein the collar further includes a cam surface defined along an interior portion of the collar and the apparatus further comprises a pressing member captured within the cam surface, wherein rotation of the collar with respect to the rod causes the pressing member to press against a longitudinal face of the saw blade.

53. An apparatus as in claim 52, wherein the pressing member is selected from a pin and a ball.

54. An apparatus as in claim 49, wherein the collar does not axially displace along the longitudinal axis of the rod when the collar is rotated.

55. An apparatus as in claim 54, wherein the collar further includes a cam surface defined along an interior portion of the collar and the apparatus further comprises a pressing member selected from a pin and ball captured within the cam surface, wherein rotation of the collar with respect to the rod causes the pressing member to press against a longitudinal face of the saw blade, wherein the apparatus is locked in a saw blade release position when the pin reaches the second portion of the L-shaped slot and insertion of a saw blade into the apparatus automatically causes the apparatus to move to a saw blade clamped position.

56. An apparatus comprising:
a rod having a saw blade receiving slot having a first portion of a first width and a second portion of a second width, wherein the second width is greater than the first width,
a control member slidably supported within the second portion of the saw blade receiving slot, wherein the control member has a width less than the first width and is biased towards the first portion of the saw blade receiving slot and
a collar rotatably supported by the rod between a blade clamping position and a blade release position, wherein insertion of a saw blade into the first and second portions of the saw blade receiving slot while the collar is in the blade release position pushes the control member rearward and causes the collar to automatically return to the blade clamping position.

57. An apparatus as in claim 56, wherein the collar comprises an L-shaped slot, wherein a first portion of the L-shaped slot extends radially with respect to the rod and a second portion of the L-shaped slot extends longitudinally with respect to the rod.

58. An apparatus as in claim 57, further comprising a pin received within the L-shaped slot, wherein the pin is biased towards a forward end of the saw blade receiving slot, wherein the pin radially moves along the first portion of the L-shaped slot when the collar is rotated with respect to the rod and wherein the pin is biased along the second portion of the L-shaped slot when the pin reaches the second portion of the L-shaped slot.

59. An apparatus as in claim 56, wherein a cam surface is defined around an inner surface of the collar and the cam surface biases a pressing member towards the saw blade receiving slot when the collar is rotated towards the blade clamping position.

60. An apparatus as in claim 59, wherein the pressing member is a blade lock pin that engages a blade lock hole disposed within a base portion of the saw blade and the blade lock pin has been treated to prevent the adherence of dust.

61. An apparatus as in claim 60, further comprising an auxiliary sleeve coupled with the rod, the auxiliary sleeve contacting a shoulder portion of the blade mounted in the blade receiving slot.

62. An apparatus as in claim 61, wherein an auxiliary pin attaches the auxiliary sleeve to the rod.

63. A blade clamp comprising:
first means for securely attaching a blade within a slot formed in a rod, the first means having a blade release position and a blade clamp position, wherein the first means further comprises means for engaging a hole formed in the blade in order to securely attach the blade to the rod and
second means for locking the first means in the blade release position, wherein the second means automatically returns the first means to the blade clamping position by simply inserting the blade into the slot.

64. A blade clamp as in claim 63, wherein the first means comprises means for pressing a longitudinal face of the blade against a longitudinal face of the slot.

65. A blade clamp as in claim 63, wherein the first means comprises a collar having a cam surface formed on the inner surface of the collar, wherein the collar is rotatably supported by the rod.

66. A blade clamp as in claim 65, wherein the first means further comprises a pressing member slidably disposed within a hole formed in the rod adjacent to the slot, wherein the cam surface urges the pressing member towards the slot when the collar is rotated toward the blade clamping position.

67. A blade clamp as in claim 66, wherein the collar does not axially displace relative to the rod when the collar is rotated from the blade clamping position to the blade release position.

68. A blade clamp as in claim 63, wherein the second means comprises an operating member and a spring disposed within the slot, wherein the operating member is biased toward the blade release position by the spring.

69. A blade clamp as in claim 68, wherein the first means comprises:
a collar having a cam surface formed on the inner surface of the collar, wherein the collar is rotatably supported by the rod and the collar does not axially displace relative to the rod when the collar is rotated from the blade clamping position to the blade release position and
a pressing member slidably disposed within a hole formed in the rod adjacent to the slot, wherein the cam surface urges the pressing member towards the slot when the collar is rotated toward the blade clamping position.

70. A tool-less blade clamp (10, 50) comprising:
a rod (2, 52) comprising a slot (2a, 2c, 52c) and a guide slot (2b, 52b) formed substantially perpendicularly to the slot (2a, 2c, 52c),
a control member (20, 56) slidably disposed within the slot (2a, 2c, 52c),
a spring (21, 57) biasing the control member (20, 56) towards a forward portion of the slot (2a, 2c, 52c) and
a sleeve (11, 53) rotatably supported by the rod (2, 52), the sleeve (11, 53) being prevented from axially displacing with respect to the rod (2, 52) when the sleeve (11, 53) rotates about the rod (2, 52).

71. A tool-less blade clamp (10, 50) as in claim 70, further comprising an L-shaped slot (16, 53*a*) formed in the sleeve (11, 53) and having a blade lock slot (16*b*, 53*ab*) disposed substantially perpendicularly to a blade lock control slot (16*a*, 53*aa*).

72. A tool-less blade clamp (10, 50) as in claim 71, wherein the control member (20, 53) further comprises a pin (22, 55) extending through the guide slot (2*b*, 52*b*) that travels within the L-shaped slot (16, 53*a*).

73. A tool-less blade clamp (10, 50) as in claim 72, wherein the rod (2, 52) further comprises a hole (2*e*, 59*a*) formed substantially perpendicular to the slot (2*a*, 2*c*, 52*c*), a pressing member (18, 51) is slidably disposed within the hole (2*e*, 59*a*) and a cam surface (17, 53*b*) is defined along an inner surface of the sleeve (11, 53), wherein the cam surface (17, 53*b*) urges the pressing member (18, 51) towards the slot (2*a*, 2*c*, 52*c*) when the sleeve (11, 53) is rotated about the rod (2, 52) to a blade clamp position.

74. A tool-less blade clamp (10, 50) as in claim 73, wherein the cam surface (17, 53*b*) permits the pressing member (18, 51) to release from the slot (2*a*, 2*c*, 52*c*) when the sleeve (11, 53) is rotated about the rod (2, 52) to a blade release position.

75. A tool-less blade clamp (10, 50) as in claim 73, wherein the pressing member is a blade lock pin (51) and the blade lock pin (51) has been treated to prevent the adherence of dust and further comprising an auxiliary sleeve (59) coupled to the rod (52) by an auxiliary pin (60), the auxiliary sleeve (59) contacting a shoulder portion (3*c*) of a blade (3) mounted in the slot (52*c*).

76. A tool-less blade clamp (10, 50) as in claim 70, further comprising a spring (12, 54) disposed around the rod (2, 52) and biasing the sleeve (11, 53) towards a blade clamping position.

77. A tool-less blade clamp (10, 50) as in claim 70, wherein rotation of the sleeve (11, 53) towards a blade release position causes the control member (20, 53) to move towards the forward portion of the slot (2*a*, 2*c*, 52*c*) due to the biasing force of the spring (21, 57) and the sleeve (11, 53) is automatically locked in the blade release position.

78. A tool-less blade clamp (10, 50) as in claim 70, wherein the slot (2*a*, 2*c*) has a first portion (2*a*) having a first cross-section and a second portion (2*c*) having a second cross-section, the second cross-section being larger than the first cross-section, wherein the control member (20) is slidably confined within the second portion (2*c*).

79. A tool-less blade clamp (10, 50) as in claim 70, further comprising locking rings (13, 14) that restrict axial displacement of the sleeve (11, 53) relative to the rod (2, 52).

80. A tool-less blade clamp (10, 50) as in claim 70, wherein insertion of a blade (3) into the slot (2*a*, 2*c*, 52*c*) when the tool-less blade clamp is in a blade release position pushes the control member (20, 56) rearward and automatically causes the sleeve (11, 53) to return to a blade clamping position.

\* \* \* \* \*